(12) United States Patent
Moody et al.

(10) Patent No.: US 7,604,420 B2
(45) Date of Patent: Oct. 20, 2009

(54) GUN AND BOW CAMERA MOUNT

(75) Inventors: Jeffrey R. Moody, Powell, TN (US);
Kevin L. Moody, Powell, TN (US);
James R. Dodson, Madisonville, TN (US)

(73) Assignee: Deer Ridge Innovations, Inc., Powell, TN (US)

( * ) Notice: Subject to any disclaimer, the term of this patent is extended or adjusted under 35 U.S.C. 154(b) by 549 days.

(21) Appl. No.: 11/416,531

(22) Filed: May 3, 2006

(65) Prior Publication Data
US 2007/0031142 A1 Feb. 8, 2007

Related U.S. Application Data

(60) Provisional application No. 60/595,774, filed on Aug. 4, 2005.

(51) Int. Cl.
*G03B 17/00* (2006.01)

(52) U.S. Cl. ........................................ 396/419; 396/426

(58) Field of Classification Search ................. 396/419, 396/421, 426; 348/373
See application file for complete search history.

(56) References Cited

U.S. PATENT DOCUMENTS

| | | | |
|---|---|---|---|
| 4,296,725 A | 10/1981 | Broderick | |
| 4,460,258 A | 7/1984 | Fukuhara | |
| 4,643,159 A | 2/1987 | Ryan | |
| 4,890,128 A | 12/1989 | Kania | |
| 5,183,951 A * | 2/1993 | Bilodeau | 42/1.01 |
| 5,520,164 A | 5/1996 | Huddleston | |
| 5,611,324 A | 3/1997 | Kurinsky | |
| 5,911,215 A | 6/1999 | Fisher | |
| 6,425,697 B1 * | 7/2002 | Potts et al. | 396/426 |

* cited by examiner

*Primary Examiner*—Rodney E Fuller
(74) *Attorney, Agent, or Firm*—Pitts & Brittian, PC

(57) ABSTRACT

A gun and bow camera mount providing an apparatus capable of mounting a conventional hand-held camera to any of various hunting weapons. The gun and bow camera mount includes a camera support having a camera mount resiliently biased against a carriage. The camera support includes typical mounting apparatus defining a shooting vector corresponding to the direction a conventional hand-held camera points when mounted to the typical mounting apparatus. The gun and bow camera mount includes features for securing the camera support to a conventional hunting weapon such that the shooting vector is fixed in a direction parallel to the line of fire of the weapon.

21 Claims, 8 Drawing Sheets

GUN AND BOW CAMERA MOUNT

CROSS-REFERENCE TO RELATED APPLICATIONS

This application claims the benefit of U.S. Provisional Application No. 60/595,774, filed Aug. 4, 2005.

STATEMENT REGARDING FEDERALLY SPONSORED RESEARCH OR DEVELOPMENT

Not Applicable

BACKGROUND OF THE INVENTION

1. Field of Invention

This invention pertains to mounting apparatus. More particularly, this invention pertains to a universal apparatus for mounting a camera on several different types of hunting weapons.

2. Description of the Related Art

Game hunting has been a popular pastime throughout human history. Before the widespread domestication of animals, hunting was a crucial component of human society. Even as animal domestication became relatively widespread and agriculture became common, hunting was a significant contributor to the human food supply.

Today, modern hunting is commonly regarded as a sport, as well as a conservationist activity. Hunting gives resource managers a valuable tool to control populations of some species that might otherwise exceed the carrying capacity of their habitat and threaten the well-being of other wildlife species, and in some instances, that of human health and safety. Additionally, modern sport hunters often seek wild game for trophy purposes, displaying the inedible portions of their kill as a sign of accomplishment. Evidence of a successful hunt provides modern hunters with a means of sharing their experience with others, both to entertain and to educate others on proper hunting technique.

In pursuit of a better method to document and evince modern hunting activities, many modern hunters attempt to operate still-image or video cameras while they hunt. The use of a camera during hunting allows a hunter to capture the image of their kill as it happens, thus preserving a record of the technique and chronology of the event. However, operation of a camera during hunting is often cumbersome. Most modern hunting weapons require both hands to properly operate. As such, holding and operating a camera while holding and operating a modern hunting weapon is often quite difficult.

The most common weapons employed by the modern hunter include the rifle, the shotgun, the crossbow, and the compound bow and arrow. A typical compound hunting bow includes at least one apparatus for eliminating vibrations in the frame. This apparatus, called a stabilizer, is a member adapted to be secured to the frame of a bow. Several aiming devices have been developed in the prior art which are adapted to attach to a conventional bow stabilizer. Similarly, several devices have been developed to mount an aiming device onto the magazine extension of a typical shotgun. Of course, it is well known in the art that several devices exist to mount various aiming devices above the barrel of a rifle.

So, in response to the difficulty of simultaneous camera and hunting weapon operation, several devices in the known prior art have been developed which allow a hunter to mount a camera to a hunting weapon. One such device provides a mechanical arm with a spring-loaded clamp secured at one end and a screw fastener secured at the other. The clamp secures one end of the mechanical arm to a compound bow, and the screw fastener secures the other end of the mechanical arm to a camera. Another device utilizes a mechanical arm forming a loop at one end, with a similar screw fastener apparatus at an opposite end. The loop is adapted to receive a standard magazine from a pump-action shotgun, and the screw fastener apparatus secures a camera to the opposite end of the mechanical arm. Still another device includes an integrated video recording device with a mounting loop capable of receiving the barrel of a rifle or other firearm.

Notwithstanding this technology, a major obstacle presents itself when a stationary mounting device is used to mount a conventional hand-held video camera to a modern hunting weapon. Specifically, most conventional hand-held video cameras react negatively to quick, sudden jarring movements, such as being struck or shaken. The common effect of such a sudden jarring movement is to cause the conventional hand-held video camera to temporarily lose focus and clarity, and in some instances, to momentarily stop recording altogether. Most modern projectile weapons, including modern hunting weapons, produce some sort of recoil action when fired. Rifles and shotguns produce recoil projecting the weapon away from the direction of firing, while the crossbow and the bow and arrow produce recoil projecting the weapon towards the direction of firing. Therefore, when a conventional hand-held video camera is fixedly mounted to any of these modern hunting weapons, the effect of use is typically poor picture quality at the moment of firing, often when good quality documentation is most desired.

Additionally, many modern hunters carry more than one weapon into the field, often of varying type and caliber. This practice allows hunters to evaluate their hunting environment and to select an appropriate weapon to accommodate the situation. However, most conventional devices used to mount a camera to a modern hunting weapon are designed to fit a single, specific type of weapon. As a result, a modern hunter wishing to mount a camera to a number of hunting weapons must carry a different mounting apparatus for each weapon. It is therefore desirable to construct a single, universal camera mounting device capable of mounting a conventional hand-held camera to any of a variety of modern hunting weapons.

BRIEF SUMMARY OF THE INVENTION

A gun and bow camera mount providing an apparatus capable of mounting a conventional hand-held camera to any of various hunting weapons is disclosed. The gun and bow camera mount includes a camera support having a camera mount movably secured to a carriage. The camera mount is defined by a platform having typical mounting apparatus capable of securing a conventional hand-held camera to the camera mount such as to limit lateral and rotational movement of the conventional hand-held camera proximate the camera mount.

In the one embodiment, the camera support includes a first dampener and a second dampener. The first dampener is positioned between the camera mount and a front member of the carriage to resiliently bias the camera mount in a neutral position. Similarly, the camera mount is resiliently biased in the neutral position by the second dampener positioned between the camera mount and a back member of the carriage. In this configuration, the first and second dampeners serve to insulate the camera mount from mechanical shock occurring to the gun and bow camera mount.

Another embodiment provides a plurality of pistons securing the camera mount to each wall of the carriage. Each piston is rotatably secured between the camera mount and the carriage by a suitable hinge, ball and socket connector, or other such device. The various pistons cooperate to resiliently bias the camera mount toward each wall of the carriage, thereby resiliently positioning the camera mount in a substantially centered configuration proximate the carriage.

The gun and bow camera mount includes features for securing the camera support to a conventional hunting weapon. The carriage of the camera support is fixedly attached to a mounting plate. The mounting plate defines a plurality of openings configured to receive various components of conventional hunting weapons. In one embodiment, a rifle collar is fixed to the mounting plate. The rifle collar includes a stock plate and a fastener removably secured to the stock plate. The rifle collar provides an adjustable sleeve for securing the gun and bow camera mount to a conventional hunting weapon.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A gun and bow camera mount providing an apparatus capable of mounting a conventional hand-held camera to any of various hunting weapons is disclosed. The gun and bow camera mount, illustrated at 10 in FIG. 1, includes a camera support 26 having a camera mount 30 carried by a carriage 28. The camera mount 30 has typical mounting apparatus 36, 38 capable of securing a conventional hand-held camera (not shown) to the camera mount 30 such as to limit lateral and rotational movement of the conventional hand-held camera proximate the camera mount 30. In this configuration, the typical mounting apparatus 36, 38 defines a shooting vector 50 corresponding to the direction a conventional hand-held camera points when mounted to the typical mounting apparatus 36, 38. In the illustrated embodiment, a mounting screw 38 and cooperating mounting pin 36 is provided to accomplish the mounting apparatus. However, it is understood by those skilled in the art that numerous other suitable mounting apparatus exist.

Figure 2:
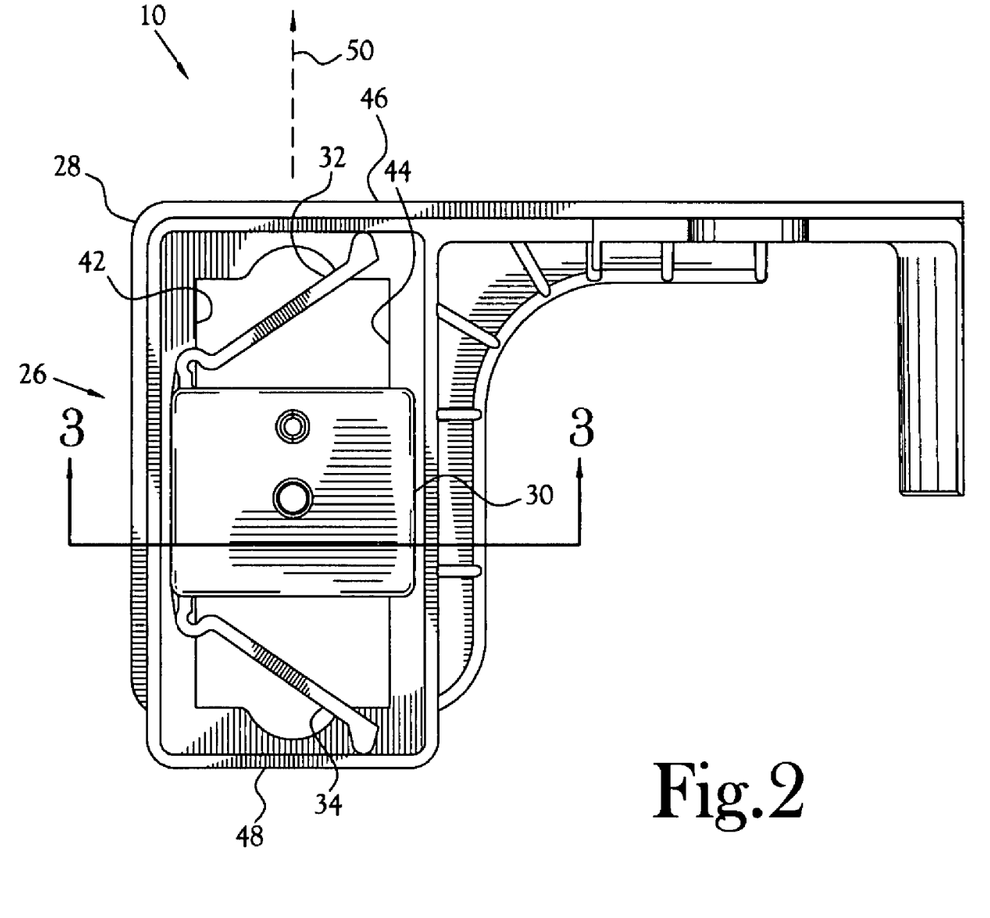
FIG. 2 is a top view of the gun and bow camera mount of FIG. 1.
Figure 3:
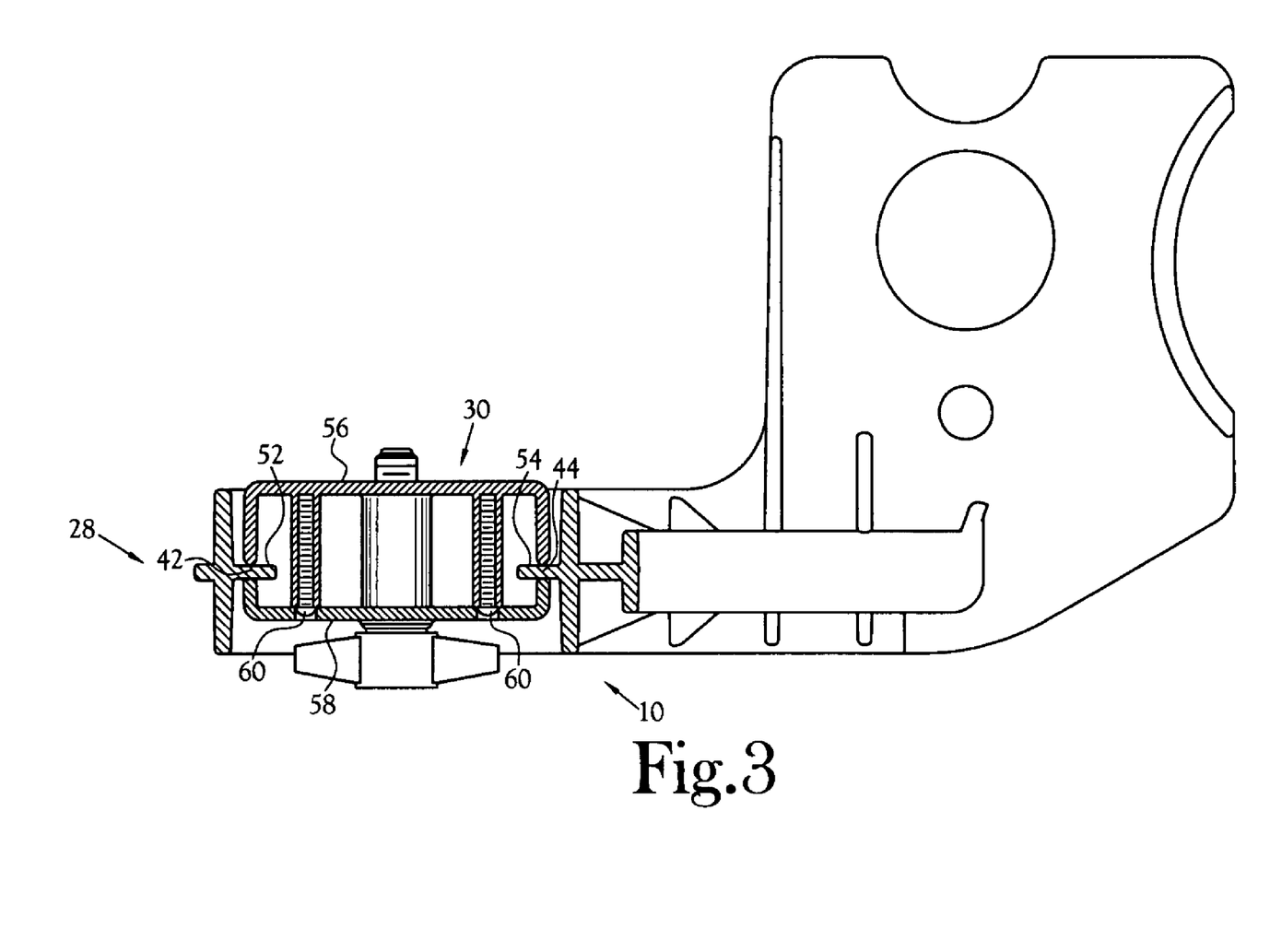
FIG. 3 is a cross-sectional view of the gun and bow camera mount, taken along 3-3 of FIG. 2.

FIG. 2 illustrates a top view of one embodiment of the gun and bow camera mount 10, constructed in accordance with several features of the present invention. In the illustrated embodiment, the camera mount 30 is slidably attached to the carriage 28 by means of first and second rails 42, 44 defined by the carriage 28. As shown in the cross-sectional side view of FIG. 3, the camera mount 30 includes a first plate 56 removably attached to a second plate 58 by a suitable fastener, such as a plurality of screws 60. Both first and second plates 56, 58 cooperate to define a first channel 52 and a second channel 54. The first and second channels 52, 54 are adapted to receive the first and second rails 42, 44, respectively. Referring now to FIG. 2, in this configuration, free movement of the camera mount 30 proximate the carriage 28 is limited to those directions substantially parallel to the shooting vector 50. Of course, those skilled in the art will recognize other configurations suitable for slidably securing the camera mount 30 to the carriage 28 without departing from the spirit and scope of the present invention.

As shown in FIG. 2, the carriage 28 includes a front member 46 and a back member 48. In the present embodiment, the camera support 26 includes a first dampener 32 and a second dampener 34. The first dampener 32 is positioned between the camera mount 30 and the front member 46 to resiliently bias the camera mount 30 against the front member 46. Similarly, the camera mount 30 is resiliently biased against the back member 48 by the second dampener 34 positioned between the camera mount 30 and the back member 48. In this configuration, the first and second dampeners 32, 34 serve to bias the camera mount 30 to a neutral position pending application of mechanical shock to the camera mount 10. Upon application of mechanical shock, the first and second dampeners 32, 34 serve to insulate the camera mount 30 from the portion of mechanical shock occurring in a direction parallel to the shooting vector 50. Such mechanical shock results, for example, from the recoil of a conventional hunting weapon. In the illustrated embodiment, each of the first and second dampeners 32, 34 is defined by leaf spring fixed at opposite ends to the camera mount 30. Those skilled in the art will recognize that springs, pneumatic pistons, hydraulic pistons, polymeric foam, and other such devices are suitable to accomplish the first and second dampeners 32, 34 without departing from the spirit and scope of the present invention.

Figure 4:
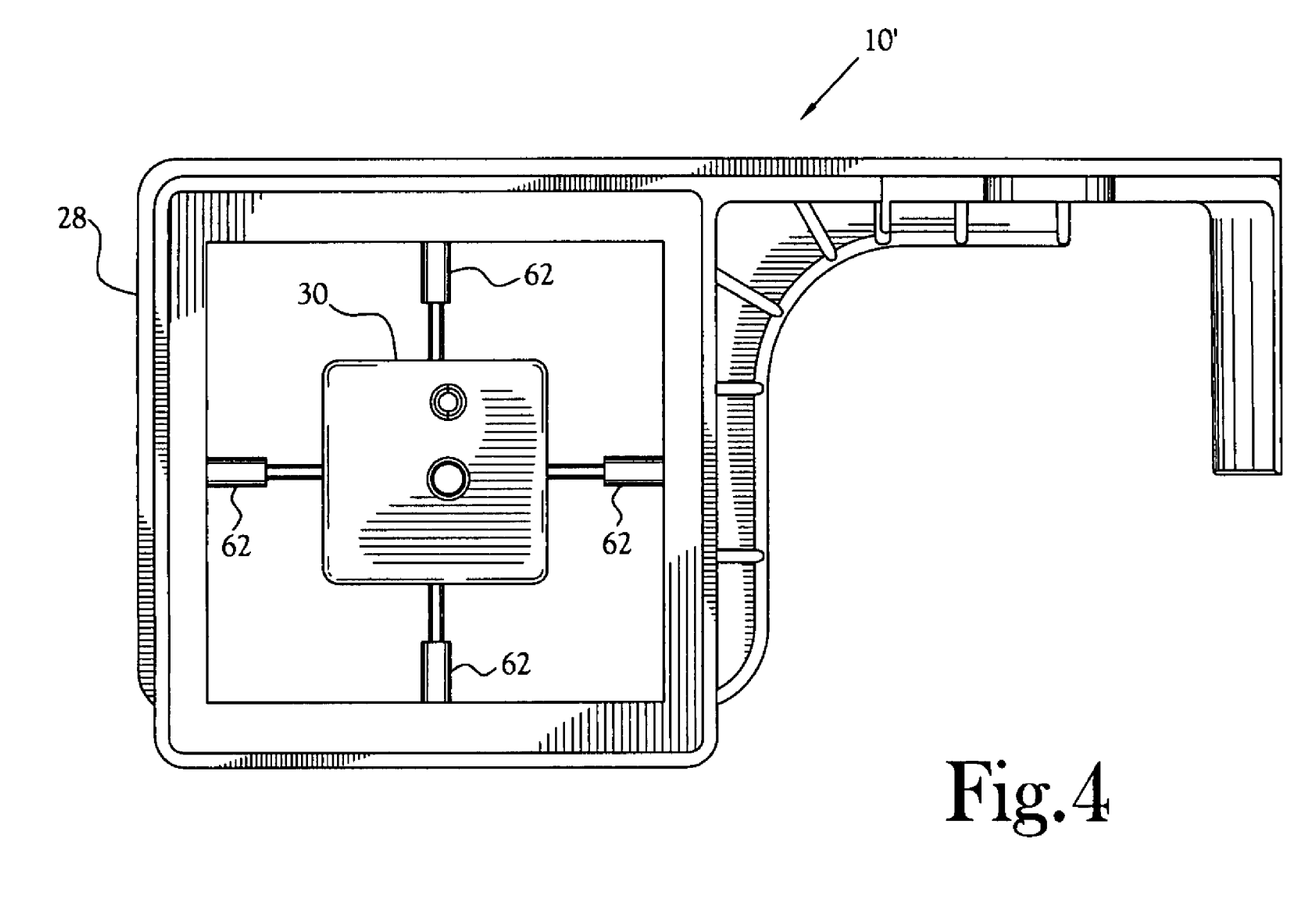
FIG. 4 is a top view of an alternate embodiment of the gun and bow camera mount.

In another embodiment, illustrated in FIG. 4, the camera mount 30 is secured to each wall of the carriage 28 by a plurality of pistons 62. Each piston 62 is rotatably secured between the camera mount 30 and the carriage 28 by a suitable hinge, ball and socket connector, or other such device. The various pistons 62 cooperate to resiliently bias the camera mount 30 toward each wall of the carriage 28, thereby resiliently positioning the camera mount 30 in a neutral position proximate the carriage 28. In this configuration, the pistons 62 cooperate to insulate the camera mount 30 from mechanical shock occurring in various directions, such as the multidirectional and rotational shock resulting from running or jumping while holding the gun and bow camera mount 10'. Those skilled in the art will recognize other configurations and devices suitable for insulating the camera mount 30 from mechanical shock, and such configurations and devices may be used without departing from the spirit and scope of the present invention.

Figure 1:
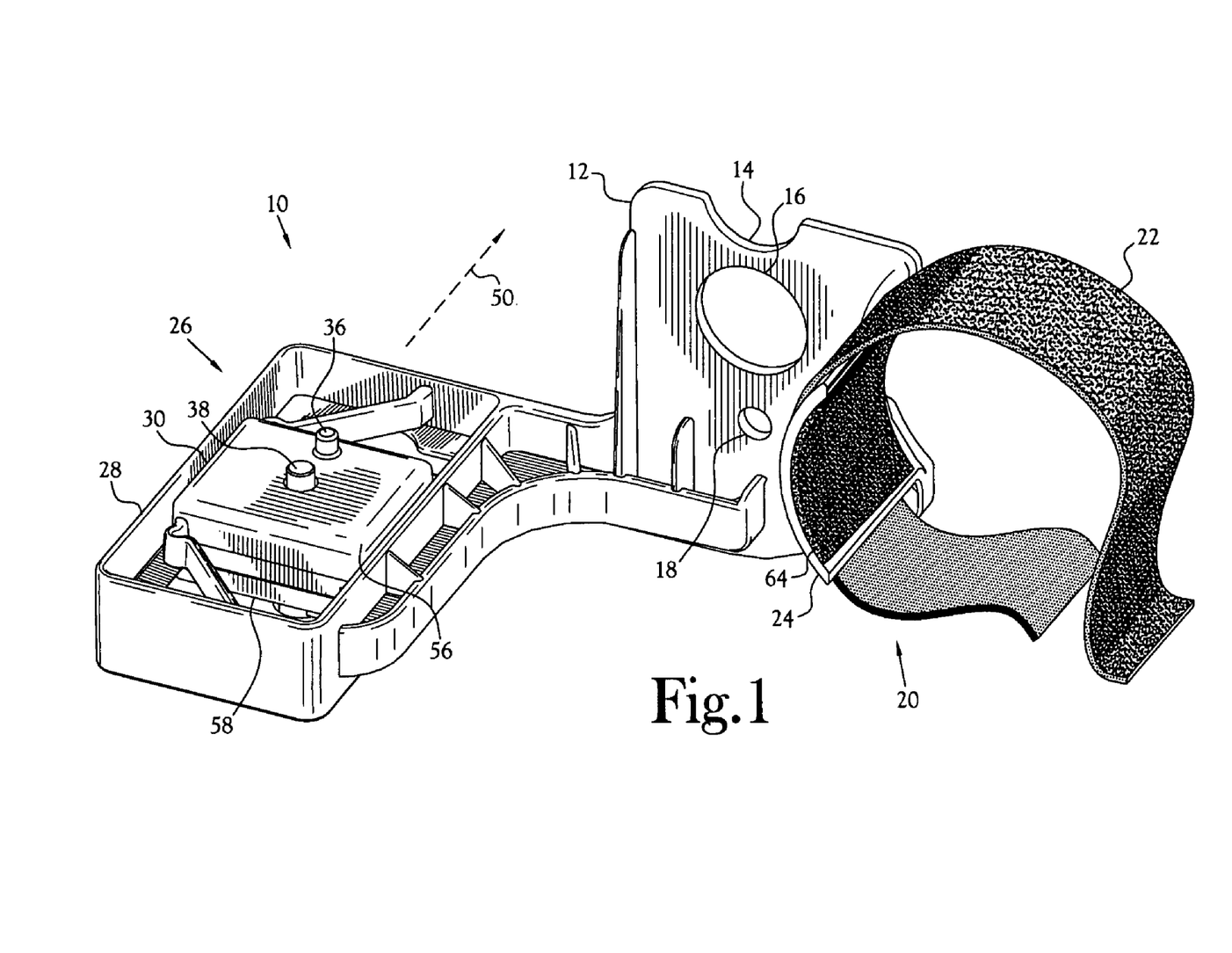
FIG. 1 is a perspective view of a gun and bow camera mount constructed in accordance with several features of the present invention.

Referring now to FIG. 1, the gun and bow camera mount 10 includes features for securing the camera support 26 to a conventional hunting weapon. In the illustrated embodiment, the carriage 28 of the camera support 26 is fixedly attached to a mounting plate 12. The mounting plate 12 is defined by a substantially rigid surface configured substantially orthogonally to the shooting vector 50.

As shown in FIG. 1, the mounting plate 12 defines a shotgun barrel opening 14 and a shotgun magazine opening 16.

The shotgun barrel opening 14 and the shotgun magazine opening 16 are configured along the mounting plate 12 such that the shotgun magazine opening 16 substantially registers with a conventional shotgun magazine as the shotgun barrel opening 14 substantially registers with a conventional shotgun barrel. In this configuration the mounting plate 12 is adapted to secure the gun and bow camera mount 10 to a conventional shotgun with the shooting vector 50 substantially parallel to the shotgun barrel.

Figure 5:
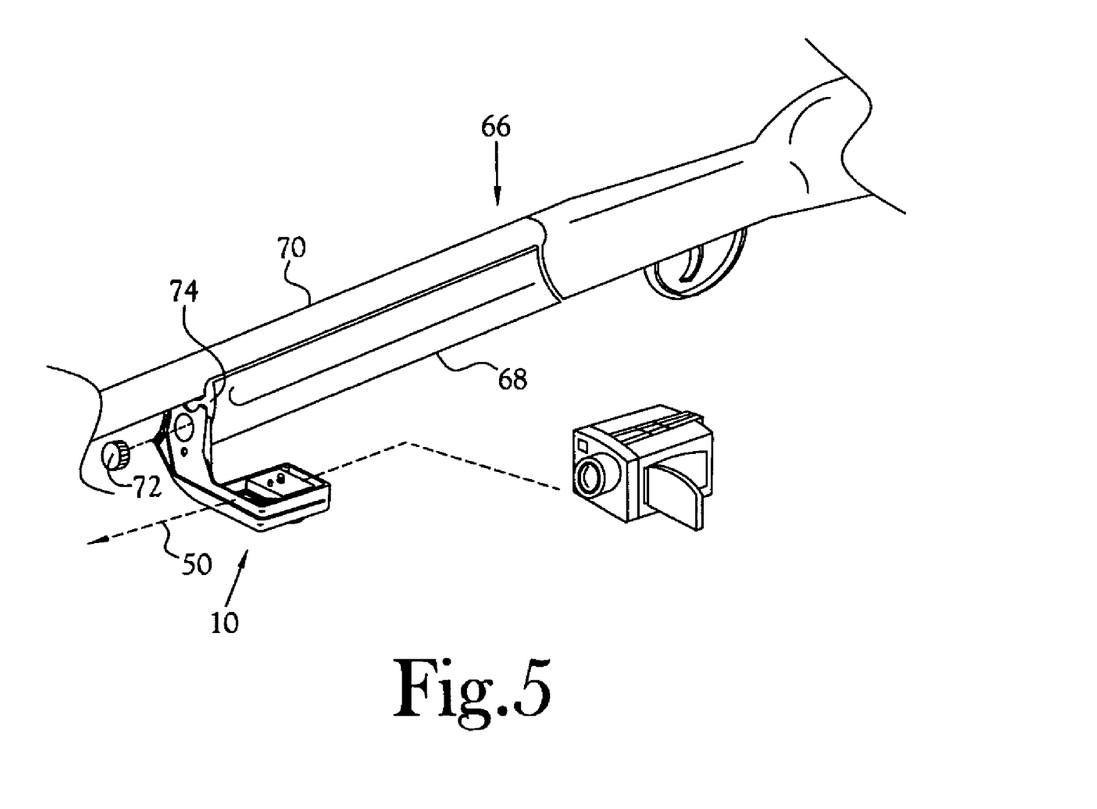
FIG. 5 is a perspective view showing the gun and bow camera mount of FIG. 1 mounted to a conventional shotgun.

FIG. 5 illustrates the gun and bow camera mount 10 secured to a conventional shotgun. As shown in FIG. 5, a conventional shotgun 66 includes a magazine 68 disposed along the underside of the shotgun barrel 70. The magazine 68 typically has a threaded magazine cap 72 positioned at a distal end of the magazine 74. The magazine cap 72 is typically selectively removable by the user. In use, the magazine cap 72 is removed, and the gun and bow camera mount 10 is positioned proximate the conventional shotgun 66 such that the magazine opening 16 substantially registers with the distal end of the magazine 74 as the shotgun barrel opening 14 substantially registers with the shotgun barrel 70. Once in place, the magazine cap 72 is reattached to the magazine 68 to secure the gun and bow camera mount 10 to the shotgun 66.

Figure 6:
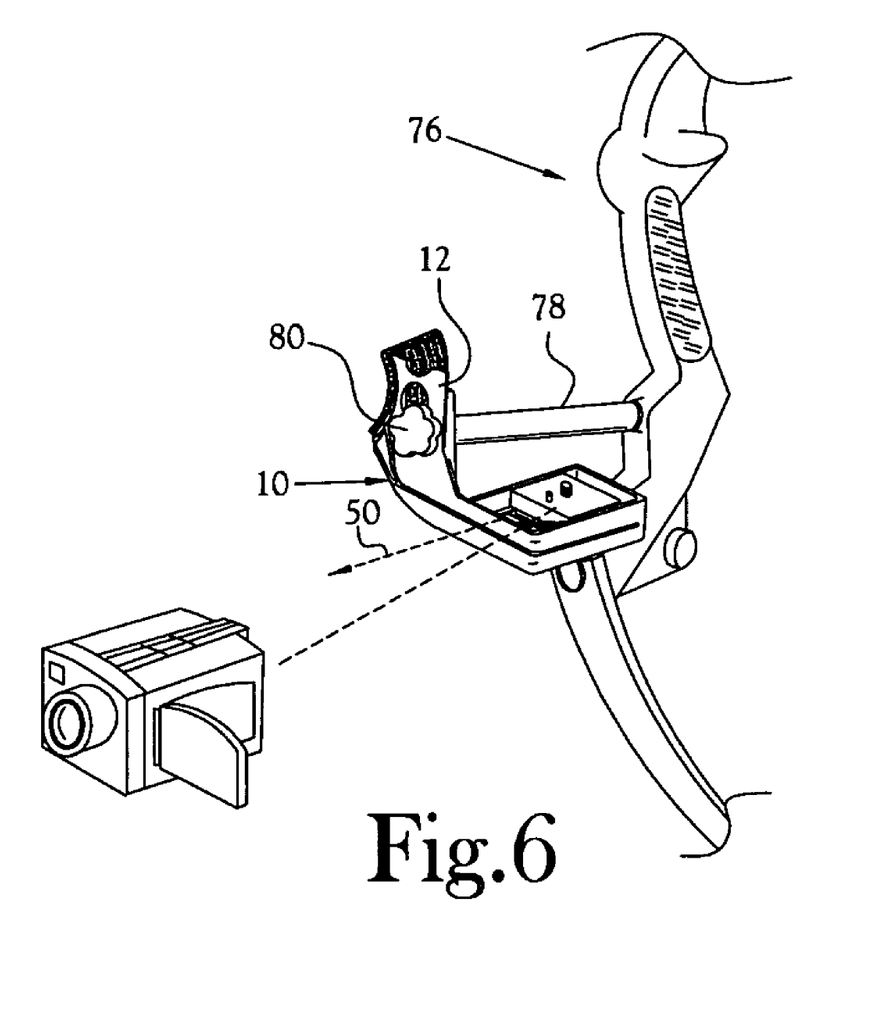
FIG. 6 is a perspective view showing the gun and bow camera mount of FIG. 1 mounted to a conventional hunting bow.

Referring to FIG. 1, the mounting plate 12 further defines a stabilizer opening 18. The stabilizer opening 18 is adapted to receive a standard compound bow stabilizer. FIG. 6 illustrates the gun and bow camera mount 10 secured to a conventional compound bow 76. As shown in FIG. 6, a conventional compound bow 76 includes a stabilizer 78 having a threaded end cap 80. The stabilizer 78 is defined by a substantially linear member protruding from the bow 76 in a direction parallel to the line of fire of the bow 76. In use, the end cap 80 is selectively removed, and the gun and bow camera mount 10 is positioned such that the stabilizer 78 is received by the stabilizer opening 18. The end cap 80 is then reattached to the stabilizer 78 to secure the mounting plate 12 to the compound bow 76. The mounting plate 12 is thus adapted to secure the gun and bow camera mount 10 to a conventional compound hunting bow with the shooting vector 50 substantially parallel to the direction of fire of the conventional compound hunting bow.

Referring to FIG. 1, a rifle collar 20 is fixed to the mounting plate 12. The rifle collar 20 provides an adjustable sleeve for securing the gun and bow camera mount 10 to a conventional hunting weapon. In the illustrated embodiment, the rifle collar 20 includes a stock plate 24 and a fastener 22 removably secured to the stock plate 24. The stock plate 24 is defined by a substantially rigid plate contoured to substantially register with a portion of the stock and barrel of a conventional rifle. In the illustrated embodiment, a contoured pad 64 is provided to insulate the stock plate 24 from direct contact with the stock and barrel of the conventional rifle. In this way, the contoured pad 64 serves to protect the finish of the stock and barrel of the conventional rifle from scratching or marring due to direct contact with the stock plate 24. However, it will be understood that the contoured pad 64 is not necessary to accomplish the rifle collar 20 of the present invention. In the illustrated embodiment, the fastener 22 is defined by a length of hook and loop fastener material adapted to loop around a portion of the stock and barrel of a conventional rifle and secure the rifle to the stock plate 24. Of course, those skilled in the art will appreciate several other devices and configurations suitable for use to accomplish the fastener 22 without departing from the spirit and scope of the present invention.

Figure 7:
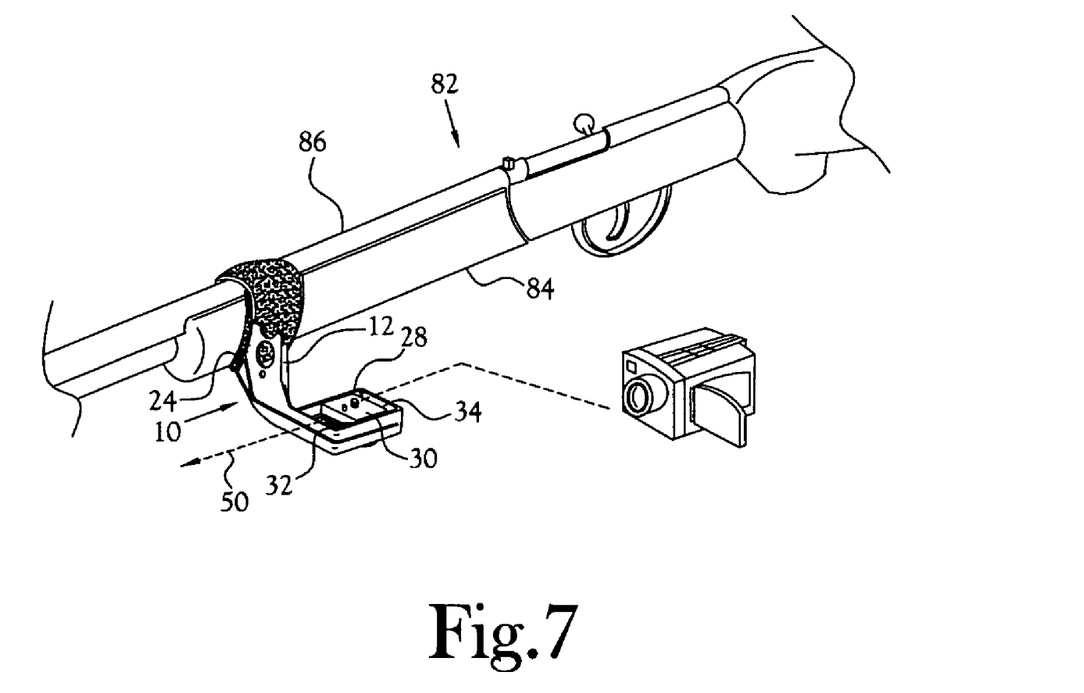
FIG. 7 is a perspective view showing the gun and bow camera mount of FIG. 1 mounted to a conventional compound hunting rifle.

FIG. 7 illustrates the gun and bow camera mount 10 secured to a conventional rifle 82. As illustrated, a conventional rifle 82 includes a rifle stock 84 disposed beneath a rifle barrel 86. In use, the stock plate 24 is positioned against the rifle stock 84, and the fastener 22 is secured around the rifle barrel 86 and the rifle stock 84.

Figure 8:
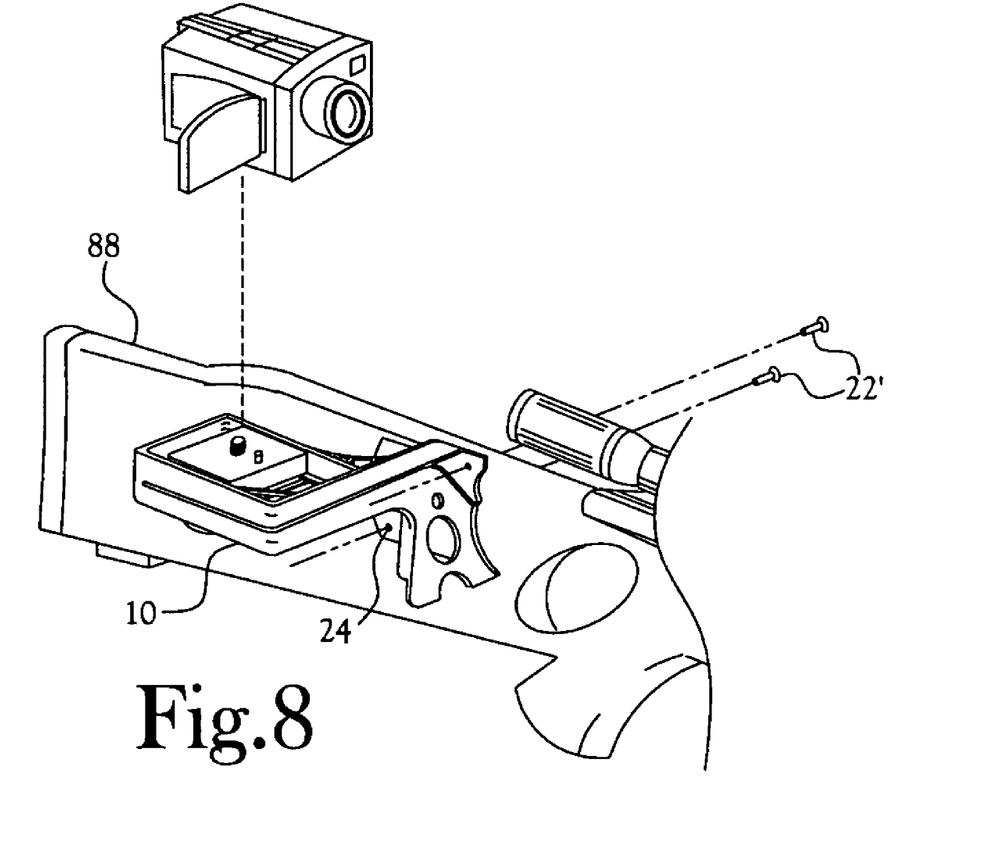
FIG. 8 is a perspective view showing the gun and bow camera mount of FIG. 1 mounted to a conventional crossbow.

FIG. 8 shows another embodiment of the gun and bow camera mount 10 secured to the butt of a conventional hunting crossbow 88. As shown in FIG. 8, the fastener 22' is defined by a plurality of screws adapted to penetrate the stock plate 24 and secure the stock plate 24 to the crossbow butt 88. Of course, it is understood that many suitable fasteners, such as frictional fasteners, adhesives, and the like, may be used to accomplish the fastener 22' without departing from the spirit and scope of the present invention.

Referring to FIGS. 5-8, in each of the aforementioned mounting configurations, the shooting vector 50 aligns in a substantially parallel orientation to the line of fire of the weapon. In each of these configurations, recoil resulting from firing the weapon is transferred through the mounting plate 12 and the carriage 28 to the first and second dampeners 32, 34. The first and second dampeners 32, 34 subsequently dissipate a portion of the recoil energy before transferring the recoil energy to the camera mount 30.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A mount for releasably securing a camera defining a shooting vector to a hunting weapon defining a direction of fire for recording hunting events and kills, said mount comprising:
   a camera support having a camera mount adapted to be releasably secured to a camera; and
   a connector carried by said camera support for releasably securing said camera support to a hunting weapon, said connector comprising:
      a mounting plate defining a first opening adapted to receive a shotgun magazine and a second opening adapted to receive a hunting bow stabilizer, said mounting plate being substantially planar;
      a stock plate fixed to and extending substantially orthogonally to said mounting plate, said stock plate being contoured to substantially register to a stock of a hunting weapon; and
      a fastener adapted to secure said stock plate to a stock of a hunting weapon.

2. The mount of claim 1, wherein said fastener is a hook and loop fastener adapted to encircle a portion of the stock of the hunting weapon.

3. The mount of claim 1, wherein a portion of said mounting plate is contoured to a shotgun barrel.

4. The mount of claim 1, said camera support further comprising:
   a carriage configured to carry said camera mount, said camera mount being linearly moveable relative to said carriage in a line that is substantially parallel to the direction of fire of the hunting weapon when said mount is secured to the hunting weapon; and a dampener disposed between said carriage and said camera mount for absorbing recoil shock along the direction of fire when the hunting weapon is discharged.

5. The mount of claim 4, said camera support further comprising:
   a first dampener disposed between said carriage and said camera mount for absorbing recoil shock occurring in a first direction along the direction of fire when the hunting weapon is discharged; and
   a second dampener disposed between said carriage and said camera mount for absorbing recoil shock occurring in a second direction along the direction of fire when the hunting weapon is discharged.

6. The mount of claim 5, wherein each of said first and second dampeners is defined by at least one leaf spring.

7. The mount of claim 4, said camera support further comprising an attachment means adapted to releasably secure a camera to said camera mount.

8. The mount of claim 7, wherein said attachment means is defined by a mounting screw and a mounting pin, each of said mounting screw and said mounting pin being disposed proximate a top surface of said camera mount.

9. The mount of claim 1, said connector being adapted to secure said camera support to the hunting weapon in such an orientation as to maintain the shooting vector of a camera secured to the camera mount in an orientation substantially parallel to the direction of fire of the hunting weapon.

10. The mount of claim 9, wherein said connector is adapted to secure said camera support to the hunting weapon to maintain a camera secured to the camera mount in an orientation horizontally offset from the direction of fire of the hunting weapon.

11. A mount for releasably securing a camera defining a shooting vector to a hunting weapon defining a direction of fire, said mount comprising:
   a carriage defining a plurality of substantially parallel rails;
   a camera mount slidably secured to said carriage along said rails, said camera mount being adapted to be releasably secured to a camera;
   a dampener disposed between said carriage and said camera mount to resist movement of said camera mount along said rails; and
   a connector carried by said carriage, said connector being adapted to releasably secure said carriage to the hunting weapon in an orientation with said rails substantially parallel to the direction of fire;
   whereby when said mount is secured to the hunting weapon and the hunting weapon is discharged, said camera mount slides along said rails in response to recoil shock from the weapon and said dampener insulates said camera mount from at least a portion of the recoil shock imparted to the camera mount in a direction substantially parallel to said rails.

12. The mount of claim 11, wherein said camera mount defines a platform slidably secured along said rails in a substantially parallel planar configuration proximate said rails and wherein said camera mount further defines an attachment means adapted to releasably secure a camera to said platform.

13. The mount of claim 12, said attachment means being configured to releasably secure a camera to said platform in an orientation with the shooting vector of the camera substantially parallel to said rails.

14. The mount of claim 11, said camera mount being normally maintained in a neutral position, said dampener being configured to resist movement of said camera mount from said neutral position.

15. The mount of claim 14, said mount further comprising:
   a first dampener configured to resist movement of said camera mount in a first direction along said rails; and
   a second dampener configured to resist movement of said camera mount in a second direction along said rails.

16. The mount of claim 15, wherein each of said first and second dampeners is defined by at least one leaf spring.

17. The mount of claim 11, said connector comprising:
   a substantially rigid stock plate defining a contoured portion adapted to substantially register to the stock of a hunting weapon; and
   a fastener for securing said stock plate to the stock of a hunting weapon.

18. The mount of claim 17, wherein said fastener is a hook and loop fastener adapted to encircle a portion of the stock of the hunting weapon.

19. The mount of claim 17, said connector further comprising a substantially planar mounting member defining an opening adapted to receive a shotgun magazine.

20. The mount of claim 19, wherein said stock plate extends substantially perpendicularly from said a mounting member.

21. The mount of claim 19, wherein said mounting member further defines an opening adapted to receive the hunting bow stabilizer.

* * * * *